June 5, 1956 J. LOVE 2,749,167
LATCH FOR COVER PANELS
Filed Oct. 11, 1952 4 Sheets-Sheet 1

Inventor
JOHN LOVE
Attorney

June 5, 1956  J. LOVE  2,749,167
LATCH FOR COVER PANELS
Filed Oct. 11, 1952  4 Sheets-Sheet 2
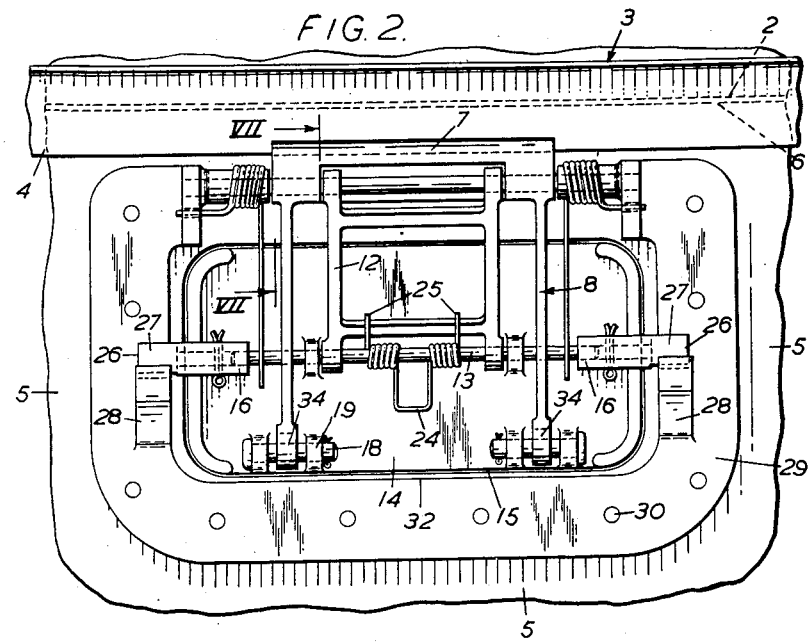
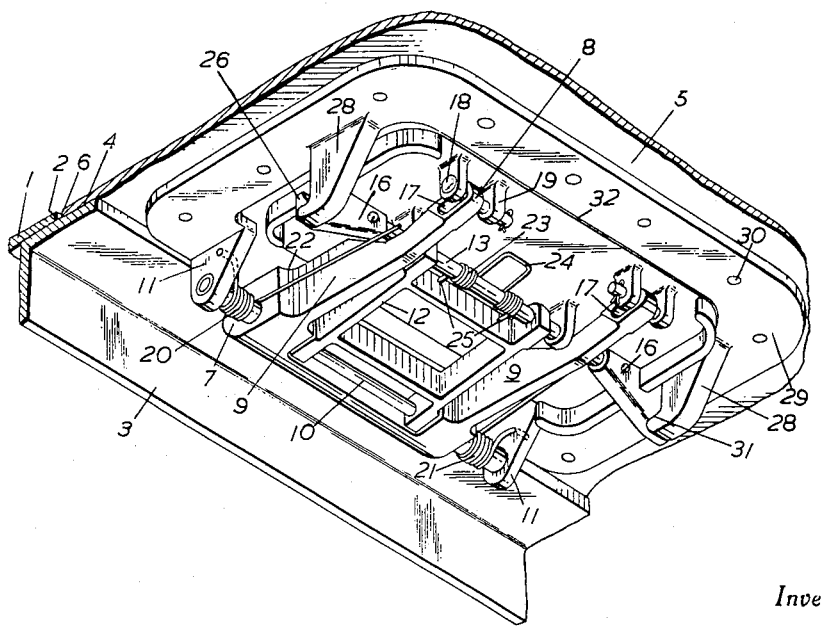
Inventor
JOHN LOVE
By Jucke + Jucke
Attorney June 5, 1956   J. LOVE   2,749,167
LATCH FOR COVER PANELS
Filed Oct. 11, 1952   4 Sheets-Sheet 3
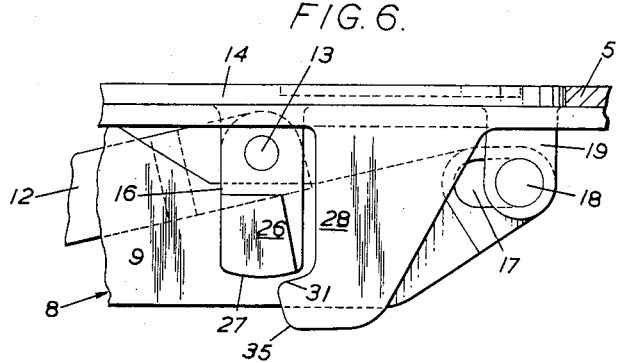
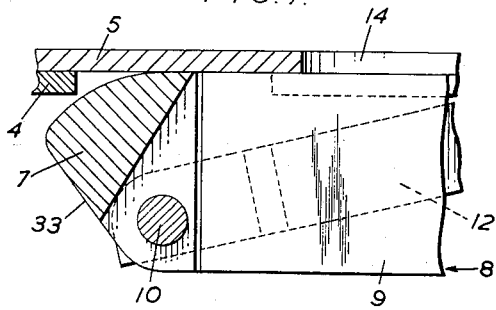
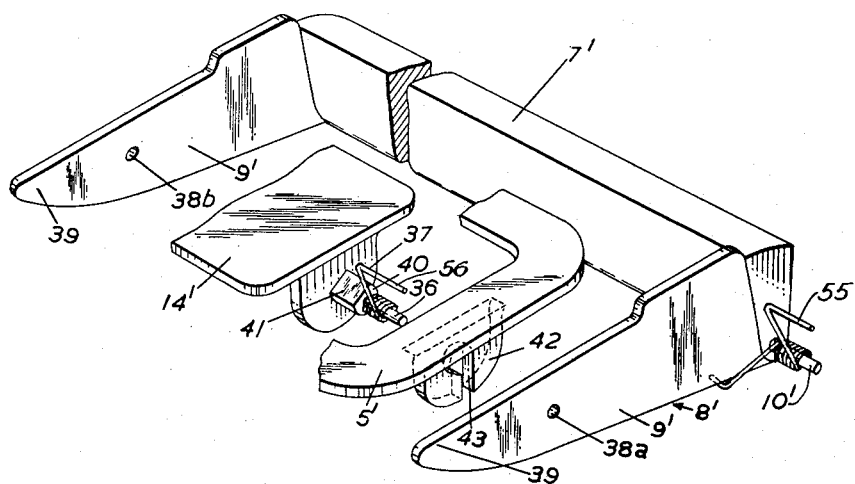
Inventor
JOHN LOVE
Attorney June 5, 1956  J. LOVE  2,749,167
LATCH FOR COVER PANELS
Filed Oct. 11, 1952  4 Sheets-Sheet 4
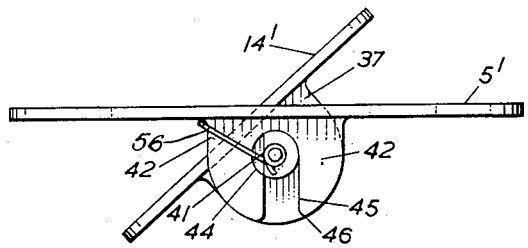
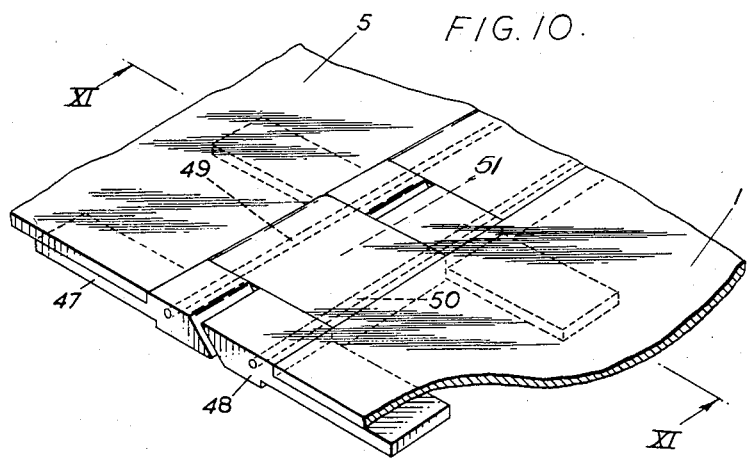
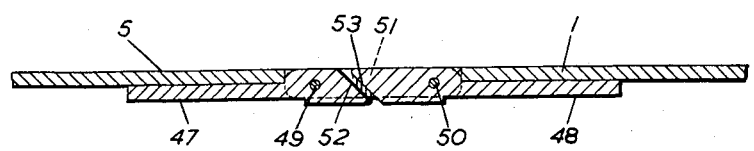
Inventor
JOHN LOVE
By *Lucka & Lucka*
Attorney

United States Patent Office 2,749,167
Patented June 5, 1956

2,749,167

LATCH FOR COVER PANELS

John Love, Langside, Glasgow, Scotland, assignor to K. A. C. Limited, Glasgow, Scotland, a British company Application October 11, 1952, Serial No. 314,295

Claims priority, application Great Britain October 12, 1951

5 Claims. (Cl. 292—226)

This invention concerns cover panels for inspection and other openings and whilst it is applicable to a large variety of different forms of cover panels which may be hinged or otherwise, it has especial reference to cover panels for inspection and other openings in the skin of an aircraft, e. g. in the skin of the fuselage or wings of an aircraft.

Such a cover panel for use in an aircraft frequently has to be released and opened or removed by a member of an aircrew wearing gloves (often several pairs superposed) and is provided with a hand-hole to facilitate the gripping of the panel for effecting its opening, said handhole having a cover adapted to be pushed inwards by the gloved hand used to grip the panel preparatory to opening it and being associated with a device for locking the cover panel in position and which locking device is released, on the hand-hole cover being pushed inwards, for the purpose of freeing the cover panel. Experience has shown that there is a serious danger of the hand-hole cover of a cover panel of the kind referred to being accidentally operated and the cover panel released as a result of the inward pressure of the air upon the hand-hole cover when the aircraft is in flight, and it is an object of this invention to provide an improved hand-hole cover arrangement which will ensure against accidental release of the cover panel simply by inward pressure of air on the hand-hole cover when the aircraft is in flight.

According to this invention there is provided a cover panel for an inspection or other opening, such panel having a hand-hole to facilitate its manipulation, a cover for said hand-hole and movable relatively to the said cover panel, and locking means, controlled by said handhole cover, for releasably retaining the cover panel in or over the said inspection or other opening to be closed thereby, and means for securing the said hand-hole cover against accidental panel releasing movement relative to said cover panel.

According to a further aspect of the invention there is provided a cover panel for an inspection or other opening, such panel having locking means for co-operating with the structure to which the panel is to be applied so as to retain the panel in or over the said inspection or like opening, said locking means being so controlled by a cover provided for a hand-hole in said panel, that inward movement of such hand-hole cover with respect to the said panel will release the latter, and means for securing the said hand-hole cover against accidental inward movement.

According to a still further aspect of the invention there is provided a cover panel for an inspection or other opening, such panel having locking means for so co-operating with the structure to which the said cover panel is applied as to retain the panel in or over the said inspection or other opening, said panel having a hand-hole to facilitate its manipulation and a cover for such handhole, said hand-hole cover being so coupled to the said panel locking means that bodily inward movement of the hand-hole cover with respect to the cover panel from its normal position will release the cover panel from the said structure, and means for securing the said hand-hole cover against the said bodily inward movement (relative to the cover panel) under the action of pressure applied uniformly or symmetrically thereto.

According to a further feature of the invention the said means for securing the hand-hole cover against cover panel releasing movement are arranged for release by a preliminary movement of the hand-hole cover, such preliminary movement being other than a mere bodily movement of the whole hand-hole cover in the direction in which the operating force is applied.

According to a further aspect of the invention there is provided a cover panel for an inspection or other opening, such panel having means for locking it to the structure in which the said opening is provided and a handhole to facilitate its manipulation; a cover for said handhole and means whereby bodily inward movement of the said hand-hole cover will effect the release of the said cover panel locking means thereby to release the said panel, and means for securing the said hand-hole hover against the said bodily inward movement, but such securing means being adapted for release, to free such cover for bodily inward movement, by the preliminary asymmetrical application of force to the said hand-hole cover.

Thus the said hand-hole cover may be mounted for pivotal movement with respect to the said cover panel about a fulcrum axis parallel to the surface or to a plane tangential to the surface of said cover panel and wherein said cover-panel securing means are adapted for releasing operation by movement of said hand-hole cover about said fulcrum axis by the asymmetrical application of force thereto.

Conveniently the said hand-hole cover is carried by or associated with a free end or part of a locking lever for the cover-panel which is adapted to co-operate with the structure to which the cover panel is applied, this locking lever being pivoted to the cover panel on an axis parallel to, or to a plane tangential to, the cover-panel, and said hand-hole cover being pivotal or rockable about the fulcrum axis which is parallel to said locking lever pivot axis and having catch means normally interlocking with keep means on the cover panel to secure the hand-hole cover against bodily movement in a cover panel releasing direction, but being initially rockable about its fulcrum axis to release said catch means to free it from the cover panel to permit inward bodily movement relative to the latter.

The said locking means for releasably retaining the cover panel in the said inspection or like opening may include latch means, e. g. a spring latch or bolt, for engagement with the structure surrounding the opening to be closed by the said cover panel and capable, when the cover panel is being inserted or placed in position in said opening, of yielding or receding from its locking position even if the said hand-hole is in its hand-hole closing position, and of then snapping back into its locking position to lock the cover panel in the said opening, thus enabling the cover panel to be quickly snapped into and locked in the inspection or like opening without it being necessary manually to actuate the hand-hole cover to withdraw the said latch means from its locking position.

Thus the locking means for the cover panel may include a locking lever pivotally connected to the rear or inner surface of the panel preferably adjacent one edge and carrying the said hand-hole cover at a position remote from its pivot, such locking lever also carrying or operating latch means for locking the cover panel in said opening when the said hand-hole cover is in its normal closed position, and said hand-hole cover having catch means for engagement with co-operating means on the said cover panel to secure the hand-hole cover against cover-panel releasing movement until the hand-hole cover and the cover panel have been released from one another.

In one arrangement the hand-hole cover may be pivotally connected to a link which is free to pivot about an axis parallel to, and preferably the same as, that about which the locking lever is free to pivot, the axis of the pivotal connection between the linkage member and the hand-hole cover being the said fulcrum axis, and the locking lever may also be pivotally connected to the hand-hole cover at a position more remote from the locking lever pivot than the said fulcrum axis, so that, during the snapping of the cover panel into its opening, pressure applied to the latch means carried by the said locking lever may cause the hand-hole cover-end of the locking lever to move inwardly and so to rock the hand-hole cover about the said fulcrum axis that the hand-hole cover and the locking lever may be released for further inward movement so as to permit the cover panel fully to be closed, after which the latch means (and with them the locking lever and hand-hole cover) may be free to return to their normal positions.

Preferably the said catch means on the hand-hole cover comprise one or more catch projections provided on inwardly directed lugs on the hand-hole cover, the or each said projection being adapted to co-operate with a hooked keep or stop plate fixed to the cover panel, rocking of the hand-hole cover about the fulcrum axis controlling the inter-engagement or dis-engagement of the said projection and keep.

Spring means are conveniently provided between the said linkage member and the cover panel and also about the fulcrum axis to ensure that the hand-hole cover returns to the flush position in the cover panel.

In an alternative arrangement the catch means on the hand-hole cover may comprise one or more flat-provided, e. g. semi- or part-cylindrical, projections provided on the inner side (e. g. on inwardly directed lugs) of the hand-hole cover and coaxial with the said fulcrum axis, the or each said projection being adapted to co-operate with a slot provided in a bracket or fixed part of or on the said cover panel and being so shaped and related in dimensions to the said flat-provided projection that the flat side of the said part-cylindrical projection must be registered with one of the sides of an outlet from the said slot before the projection may be disengaged from the said bracket or fixed part, the arrangement being such that the said projection cannot be disengaged from said slot while the hand-hole cover remains flush with the rest of the cover panel so that the hand-hole cover has to be rocked about the fulcrum axis to move it from such flush position into a releasable position.

It will, of course, be understood that alternatively, instead of the said catch projection or projections being on the hand-hole cover, it or they could be carried on the said cover panel and the said slot or slots could be provided in a part or parts on the hand-hole cover.

The cover panel may be hinged at one edge to the said surrounding structure or may be entirely detachable at all its edges from such structure.

When the cover panel is closed, it is preferably entirely flush with the surrounding structure, and when the said hand-hole cover is closed, it is preferably quite flush with the cover panel.

Further features of the invention will become apparent from the following description of two embodiments thereof and the appended claims.

Two embodiments of the invention as applied to a cover panel for closing an inspection opening in a substantially flat part of the skin of an aircraft are illustrated by way of example in the accompanying drawings, in which:

Figure 2 is an underneath plan view corresponding to Figure 1;

Figure 3 is an underneath perspective view corresponding to Figure 2;

Figure 6 is an enlarged view of the right hand end of Figure 4;

Figure 7 is an enlarged section on the line VII—VII of Figure 2;

Figure 8 is an exploded fragmentary perspective view of an alternative embodiment of the invention, parts of the mechanism being broken away;

Figure 9 is a sectional view of a portion of the embodiment of Figure 8;

Figure 10 is a perspective view of a hinge portion of the cover panel; and

Figure 11 is a section on the line XI—XI of Figure 10.

Figure 4:
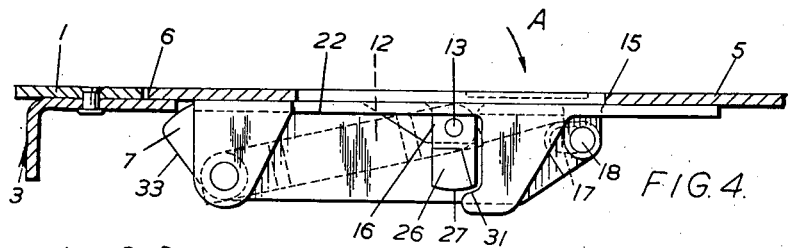
Figure 4 is a side elevation and partial section corresponding to Figure 2.
Figure 5:
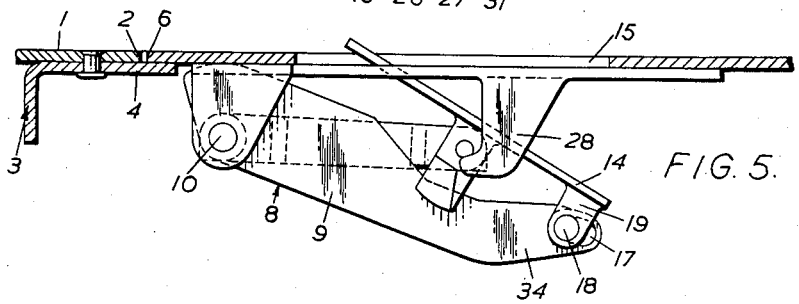
Figure 5 is a corresponding section, shown the hand-hole cover in a cover panel releasing position.

Referring to Figures 1 to 7 of the accompanying drawings, 1 is the skin of an aircraft fuselage, this skin having an oblong inspection opening 2 which is preferably furnished with rounded corners, the skin being reinforced on its inner side around said opening by a profiled metal frame 3 of angle section, one of the flanges 4 of this frame lying in a plane parallel to the plane of said skin and extending inwardly of the inspection opening 2 flush with the inner surface of the fuselage skin so as to form a ledge (see Figures 1 and 3) upon which the perimeter of the cover panel 5 for the inspection opening may rest with the outer surface of such panel flush with the outer surface of the said skin.

At the edge, not shown, opposite to the edge 6 shown in the drawing, the cover panel may be provided on its inside with one or more clips which can be engaged behind the flange of that part of the frame 3 on which this edge of the cover panel rests when closed, or alternatively hinges, preferably as hereinafter described, may be provided instead of the said clips, whilst the edge 6 of the cover panel is adapted to be releasably locked to the adjacent flange 4 of the frame 3 by means of a latch 7 (see Figures 1, 2, 3 and 4 for example) provided on a locking lever 8 pivotally carried on the inside of the cover panel. The locking lever 8 is conveniently, as seen at right angles to the plane of the panel, see Figure 2, of U-shape, the lever comprising a pair of parallel lever arms 9 wider at one end than at the other, see Figure 5, and which are rigidly joined together at their wider ends by a cross bar which forms the latch 7 and which is of approximately sector-shaped cross-sectional form as will be seen from Figure 7, the pivot of the lever comprising a pivot pin 10 passing through the lever arms 9 at the wider ends of the latter and being at right angles to these arms and adjacent the apex of the said sector-shaped latch 7 whilst the opposite curved edge of the latter has its center of curvature along the axis of the pivot pin 10, said latch being adapted for engagement under the adjacent inwardly directed flange 4 of the reinforcing frame 3 of the skin 1 of the fuselage. The pivot pin 10 of the locking lever 8 is carried by a pair of parallel brackets 11 projecting substantially at right angles from the inside of the cover panel 5 adjacent the locking edge 6 of this panel.

A carrier or link 12 is located within the locking lever 8 and is pivotally mounted at one end on the pivot pin 10. At its other end this link carries a fulcrum pin 13 on which is mounted a hand-hole cover 14 for the hand-hole of the cover panel, this hand-hole cover conveniently being of approximately rectangular shape (having rounded corners) and adapted to fit the correspondingly shaped hand-hole 15 in the cover panel 5.

The hand-hole cover 14 has a pair of inwardly projecting fulcrum brackets or lugs 16 arranged at or near each end thereof (see Figures 2 and 3), and the said fulcrum pin 13 passes into these brackets so that the hand-hole cover 14 can be rocked about the pin 13 relatively to the link 12 and the cover panel 5, the position of the fulcrum pin being mid-way between those two edges of the hand-hole cover which are parallel to the fulcrum pin.

The narrower and free ends of the two arms 9 of the locking lever 8 are also pivotally connected to the hand-hole cover through a lost motion arrangement. Thus the free ends of the locking lever arms 9 have slots 17 (see Figure 6 in particular) in which engage anchorage pins 18 each carried in a pair of inwardly projecting anchorage lugs 19 on the said hand-hole cover 14 and arranged near that edge of the same most remote from the latch part 7 of the locking lever 8, the anchorage pins 18 being parallel to the locking lever pivot 10 and fulcrum pin 13.

Conveniently the hand-hole cover may be a one piece die-casting having the fulcrum brackets 16 and anchorage lugs 19 cast integrally therewith.

The latch 7 is disengaged from adjacent the frame flange 6 by moving the hand-hole cover 14 inwardly with respect to the cover panel 5 but the hand-hole cover is normally held in the position shown in Figures 1, 2, 3 and 4, in which it is flush with the cover panel 5, by spring means. These spring means comprise a pair of torsion springs 20 and 21 arranged around the pivot pin 10 and each having one end engaged in the adjacent lug 11 on the cover panel and the other end bearing on the fulcrum pin 13 so as to urge the free end of the locking lever outwardly, this outward movement of the lever being limited by the engagement of the outer surfaces 22 of the arms 9 at the pivoted end of the lever with the inner surface of the cover panel as shown, for example, in Figures 3 and 4.

As explained previously the hand-hole cover 14 is pivotable about the fulcrum pin 13 but, as will be obvious from Figure 4, for example, it can only pivot in the direction of arrow A when the parts are in the position shown, pivotal movement of the hand-hole cover in the opposite direction being prevented by the engagement of the cover with the said outer surfaces 22 of the arms 9 of the locking lever 8 against which the hand-hole cover is normally held by means of a torsion spring 23 arranged around the fulcrum pin 13 and having one arm 24 engaged with the under-side of the hand-hole cover 14 so as to tend to urge it in an anti-clockwise direction about the pin 13 (as the parts are seen in Figure 4), and having its other arms 25 anchored to or bearing on a cross-bar of the link 12.

In order to prevent the hand-hole cover being accidentally pushed inwardly by pressure, e.g. air pressure, exerted thereon symmetrically or uniformly over the whole surface of the hand-hole cover, each of the fulcrum brackets 16 on the inner surface of the hand-hole cover is provided on its outer side with a laterally extending catch projection 26 having an aracuate outer surface 27 which is coaxial with the fulcrum pin 13 and adapted to co-operated with a hooked keep or stop plate 28 rigidly mounted on the cover panel 5, one adjacent each end of the hand-hole 15. Conveniently the said hooked keeps 28 are formed, e. g. die-cast, intergrally with a substantially rectangular rigid frame 29 secured by rivets 30 (Figure 1) to the inside of the cover panel 5 around the hand-hole 15, this rectangular frame having one of the said keeps 28 at each end thereof and also having the lugs 11 for the pivot pin 10 formed integrally thereon.

Each of the said hooked keeps 28 has a catch surface 31 of arcuate shape, the centre of curvature of such surface being at the fulcrum pin 13 when the hand-hole cover is in the closed position.

Figure 1:
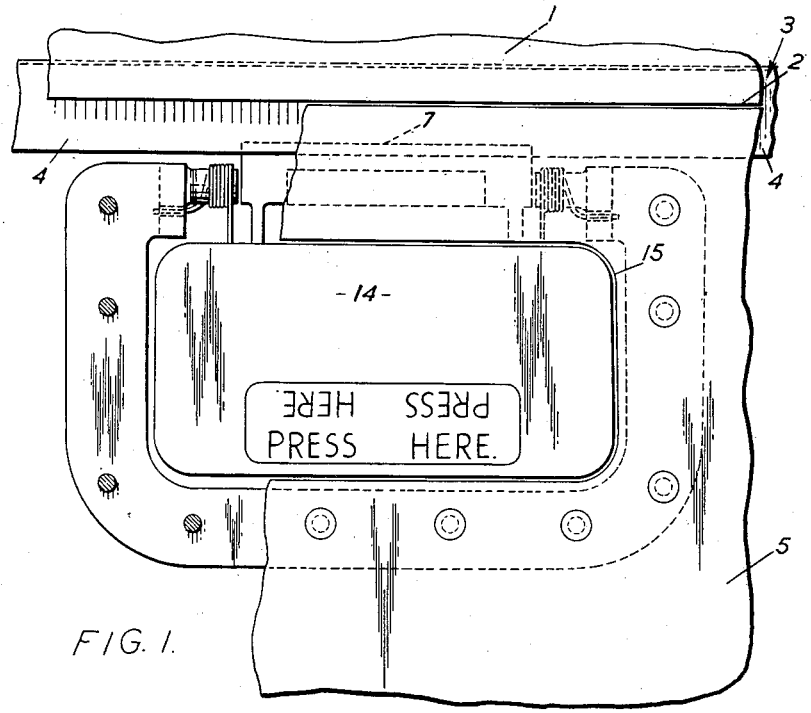
Figure 1 is a fragmentary top plan view of a portion of a cover panel having a hand-hole and a hand-hole cover, the cover panel being shown fitted into an inspection opening of an aircraft fuselage and in its closed position.

To effect the opening of the hand-hole cover it is necessary to press it asymmetrically along the edge most remote from the locking lever pivot 10, i. e. the part marked "Press here" in Figure 1, and thus to rotate it somewhat inwardly at this edge about the fulcrum pin 13, the pin and slot connection 17, 18 between the hand-hole cover and the locking lever arms 9 permitting some relative movement between these parts. This initial movement of the hand-hole cover disengages the catch projections 26 on the fulcrum brackets 16 from the hooked keeps 28 on the cover panel so as to permit the hand-hole cover 14 as a whole to be moved inwardly. Further inward pressure applied to the hand-hole cover will now cause the locking lever 8 and the link 12 to turn about the pivot pin 10 and thus disengage the latch 7 from the adjacent flange 4 of the frame 3 and permit the cover panel 5 to be removed outwardly from the opening 2.

When it is desired to open the cover panel 5 it is necessary to insert the hand (which may be heavily gloved) into the hand-hole 15. This is done by pressing the finger tips on the hand-hole cover 14 where indicated (see Figure 1) so as to rotate the hand-hole cover in the direction A (see Figure 4), the back of the hand being towards the latch 7. As a result of this rotation the knuckles will contact the hand-hole cover and will force it inwards to release the latch 7 and at the same time permit the fingers to be inserted under the edge 32 of the frame 29 surrounding the hand-hole. Thereafter, since the latch has been released, a pull on the edge 32 will open the cover panel. After the operation of the hand-hole cover to release and remove the cover panel, the spring means 20, 21 and 23 serve to return the hand-hole cover to its closed position.

The cover panel may be replaced in the inspection opening without manual operation of the hand-hole cover 14, even if this is in its fully closed position, the replacing being effected by first engaging that edge of the cover panel 5 which is remote from the latch 7 with the corresponding edge of the inspection opening 2 and then pushing the cover panel into place in this opening. As this is done the oblique surface 33 of the sector shaped latch 7 will engage the flange 4 of the profiled frame 3 and the locking lever 8 will be rotated about its pivot 10 so that its free ends 34 move inwardly and pull with them the adjacent edge of the hand-hole cover which thus rotates about the fulcrum pin 13 and disengages the catch projections 26 on the hand-hole cover from the keeps 28 on the cover panel to free the whole hand-hole cover, locking lever and link for inward movement about the locking lever pivot 10. Hence, as further pressure is exerted on the oblique surface 33 of the latch 7 as the cover panel is pressed into place, the locking lever and link will swing inwardly together with the hand-hole cover thereby to enable the cover panel fully to enter the inspection opening whereupon the spring means 20, 21 and 23 associated with the link 12 will return the latch 7 to its locking position and the hand-hole cover 14 to its closed position, the hand-hole cover being automatically relocked against accidental release.

Conveniently the corners 35 of the hooked keeps 28 over which the catch projections 26 must ride when the cover panel is replaced, are chamfered or rounded off to enable the said catch projections to pass the hooked keeps as the hand-hole cover returns under the influence of the spring means 20, 21 and 23.

It will thus be appreciated that the cover panel cannot be accidentally released by air pressure applied uniformly to the hand-hole cover at right angles to its surface, but that a differential or asymmetrical pressure must be applied to the hand-hole cover to produce a rocking of the same about the fulcrum pin 13, thereby to release the hand-hole cover and locking lever for inward movement. Also the cover panel can rapidly be replaced without manual operation of the hand-hole cover.

In a second embodiment of the invention, illustrated in

Figures 8 and 9 of the accompanying drawings, the cover panel 5' and hand-hole cover 14' are substantially the same as in the first described embodiment but the means for securing the hand-hole cover against accidental panel releasing movement are somewhat different in structure although similar in principle.

In this embodiment the locking lever 8' is of slightly modified form in side elevation, the lever arms 9' being approximately triangular and being joined, at their wider ends, by a cross bar or latch 7' of approximately sector shaped cross-section. A pivot pin 10', located in approximately the same position as the pivot pin 10, forms a pivot for the locking lever.

Two transverse pivot pins 36 (hereinafter called the hand-hole cover fulcrum pins) are fixedly carried by a pair of inwardly projecting lugs 37 on the hand-hole cover, these pins freely pivoting at their outer ends respectively in holes 38a, 38b in the locking lever arms. These fulcrum pins are parallel to the pivot pin 10' and are spaced from the free ends 39 of the lever arms 9', the arrangement being such that the hand-hole cover may rock freely on these pins relatively to the locking lever 8' and the cover panel 5'.

Torsion springs 55 (see Figure 8) on the locking lever pivot pin 10' are provided and act between the locking lever and the surrounding structure to urge the locking lever to such a position that the outer surface of the hand-hole cover is flush with the outer surface of the cover panel and the ends 39 of the said locking lever preferably act as a stop to limit the outward movement of the locking lever and therefore the hand-hole cover beyond this flush position, the ends 39 of the locking lever arms being adapted to contact the cover panel adjacent the junction with the hand-hole cover and similarly torsion springs 56 on the fulcrum pins 36 are provided to act between these pins and the surrounding structure for normally maintaining the hand-hole cover flush with the cover panel as before described.

In order to prevent the hand-hole cover 14' being accidentally pushed inwardly by air pressure exerted thereon or by any other pressure exerted symmetrically or uniformly over the whole surface of the hand-hole cover, each of the lugs 37 on the inner surface of the hand-hole cover is provided, on the side nearer the adjacent locking lever arm 9' and coaxially with the fulcrum pin 36, with a part-cylindrical or like flattened catch projection or boss 40 (which may, for example, be a portion of a boss through which the fulcrum pin 36 passes), this projection or boss having its flat surface 41 set at an angle less than 90° (say 60° for example) to the inside surface of the hand-hole cover 14'. Upon the cover panel 5', at either end of the hand-hole opening therein, is provided an inwardly projecting rigid lug 42 formed with an openended slot 43 for inter-engagement with one of the part-cylindrical bosses 40.

The slotted lugs 42 are conveniently formed, e. g. diecast, integrally with a substantially rectangular frame similar to the frame 29 riveted to the inside of the cover panel 5' and around the hand-hole therein, this reinforcing frame having one of the lugs 42 at each end thereof.

The slot in each of the lugs 42 comprises a circular part 44 and a narrower outlet neck 45 leading therefrom, see Figure 9, this neck being offset with respect to the centre of the circular part 44 and having its outer side tangential to the circular part so that the slot is of lopsided key-hole or approximately bayonet slot form.

The arrangement of slots and bosses is such that the diameter of the circular part 44 of the slot is equal to the diameter of the part-cylindrical boss 40 with which it is to co-operate whilst the outlet neck 45 of the slot is only slightly wider at its narrowest portion than the narrowest dimension of the said part-cylindrical boss 40 so that, unless the flat side 41 of the boss 40 lies in the direction of the outlet neck 45 of the slot, the boss cannot leave the circular portion 44 and the hand-hole cover 14' cannot be moved inwardly to open the hand-hole in the cover panel. To effect the opening of the hand-hole cover it is thus necessary to apply pressure asymmetrically to the hand-hole cover 14' to rock it about the fulcrum pins 36 against its closing spring so as to bring the flat sides 41 of the part-cylindrical bosses 40 into alignment with the outlet necks 45 of the slots 43, whereafter inward pressure on the hand-hole cover 14' will cause the bosses 40 to leave the said slots and at the same time cause the free ends 39 of the locking lever arms 9' to swing inwardly about the pivot 10', thereby moving the latch 7' in a releasing direction to free the cover panel for opening or removal from the fuselage.

To facilitate the closing of the hand-hole cover, one edge at least of the outlet neck 45 of each of the said slots is outwardly flared, as is shown at 46 in Figures 8 and 9.

If the cover panel is hinged to the surrounding skin 1, this is preferably effected, see Figures 10 and 11, by furnishing the hinged edge of the cover panel 5 with a series of spaced hinge lugs 47 projecting at right angles therefrom and aligned end-to-end with similar, but relatively reversed, lugs 48 secured to the adjacent edge of the skin 1 surrounding the opening 2 to be closed by the cover panel 5, these aligned pairs of lugs being connected hingedly together by means of parallel hinge pins 49, 50 passing one through each of the lugs and also through interconnecting or bridging links 51 arranged alongside the lugs. Thus the links 51 alternate with aligned pairs of lugs 47, 48 all along the hinged edge of the cover panel and the hinge pins extend through all the lugs and links, the pin 49 through the lugs 47 on the cover panel 5 and the other pin 50 through the lugs 48 on the skin 1. Preferably the adjoining ends of the aligned lugs of each pair are chamfered off as at 52 and 53 so that, when the cover panel is closed, these chamfered surfaces of the lugs abut one another and the lugs resist shearing movement of the cover panel relatively to the skin 1 and perpendicular to the latter and the hinge pins.

When the cover panel 5 is closed, it is preferably entively flush with the surrounding skin 1, and when the hand-hole cover 14 is closed it also is preferably quite flush with the cover panel 5.

In order that the cover panel 5 may spring outwards slightly immediately it is released by the latch 7, spring means (not shown) may be provided such that the outwards effort of such spring means shall exceed the inwards pressure that must be applied to the hand-hole cover 14 to rock it about the fulcrum pin 13 to release the cover panel, so that the cover panel will spring open despite the said inwards pressure on the hand-hole cover. Conveniently the said spring means may comprise one or more leaf or blade springs secured to the flange 4 of the profiled frame 3 reinforcing the inner side of the inspection opening 2 at a position near the ledge co-operating with the latch 7 and preferably are located at right angles to this ledge. The said leaf spring or springs are so arranged that they do not impede the proper closing of the cover panel.

When the said cover panel is hinged, torsion or other springs may also be provided at the hinged edge of the cover panel to retain the cover panel in the open position when released.

It will be appreciated that, as the whole of the mechanism is carried by the hand-hole cover 14 or 14' and the reinforcing frame 29 and as both these parts are conveniently die-castings, such parts may be provided as a unit for attachment to or insertion in an existing cover panel or the unit may be supplied to the manufacturers of aircraft for incorporation therein during building.

Although the invention has been described with particular reference to panels for aircraft, it will readily be understood that it could be applied to cover panels for other vehicles and apparatus such as for example, high speed motor cars, motor boats, railway engines and so on.

I claim:

1. A cover panel for an inspection opening in a surrounding structure, such panel being provided with a hand-hole to facilitate its manipulation; a hand-hole cover for said hand-hole; latch means on said cover panel and for engagement with the said structure to retain the said cover panel in position; a locking lever pivotally connected to the inner surface of said cover panel and also pivotally connected to said hand-hole cover and adapted to operate said latch means for releasing operation on rotation of the said locking lever due to bodily inward movement of said hand-hole cover; a link connected to said cover panel so as to be free to pivot about an axis parallel to said locking lever pivot axis, said hand-hole cover being fulcrumed on said link so that the hand-hole cover may pivot, relatively to the cover panel, about this fulcrum axis which is located between the axes of pivotal connection of the locking lever to the cover panel and hand-hole cover respectively; keep means on the cover panel; catch means on said hand-hole cover normally interlocking with said keep means to secure the hand-hole cover against said bodily inward movement, but adapted to be disengaged, to release the hand-hole cover for such movement, in response to preliminary pivotal movement of the hand-hole cover about the said fulcrum axis on the application of inwards pressure to such cover at the location of the pivotal connection of the hand-hole cover to the locking lever; and means for yieldingly returning the said hand-hole cover to its normal position after manipulation.

2. The cover panel of claim 1, in which the said catch means on the hand-hole cover has a catch surface of arcuate form coaxial with the said fulcrum axis, whilst the said keep means has an abutment surface for engagement with the said catch surface when the hand-hole cover is in position.

3. The cover panel of claim 2, in which spring means are provided between the said link and the cover panel and also about the locking lever pivot axis to ensure the return of the hand-hole cover to the flush position.

4. A cover panel for an inspection opening in a surrounding structure, such panel being provided with a substantially rectangular hand-hole to facilitate its manipulation; a hand-hole cover for said hand-hole; a U-shaped locking lever pivotally connected to the inner surface of said cover panel for pivoting about a pivot axis parallel to a longitudinal edge of said hand-hole cover; a latch, formed by the cross bar of said U-shaped locking lever, for co-operating with said surrounding structure; a lost-motion connection between the ends of the limbs of the locking lever and the inner surface of the hand-hole cover adjacent the longitudinal edge thereof most remote from said latch; a link pivoted at one end on said pivot axis; a fulcrum pin at the other end of said link and on which the said hand-hole cover is mounted mid-way between its longitudinal edges; spring means on said pivot axis and spring means on said fulcrum pin to return said hand-hole cover to said hand-hole and to move said latch into its latching position; keep means on said cover panel at each end of said hand-hole; and catch means, having a catch surface coaxial with said fulcrum pin, on each end of said hand-hole cover and co-operating with said keep means, the arrangement being such that, on the application of inwards pressure to the hand-hole cover at the location of the lost-motion connection between the said hand-hole cover and the locking lever, the former rocks about the fulcrum pin to disengage the said catch and keep means from one another thereby to free the said hand-hole cover for bodily inwards movement to pivot the locking lever about its pivot axis to disengage the said latch means from the said structure.

5. A cover panel for an inspection opening in a surrounding structure, such panel being provided with a hand-hole to facilitate its manipulation; a locking lever pivotally connected to the inner surface of said cover panel; a hand-hole cover for said hand-hole and fulcrumed to said locking lever so that the hand-hole cover may rock about this fulcrum axis relatively to the cover panel, said fulcrum axis being parallel to the axis of pivotal connection between the cover panel and the locking lever; latch means operated by said locking lever for engagement with the said surrounding structure to retain the cover panel in position, said latch means being adapted for releasing operation on rotation of the said locking lever due to bodily inward movement of the hand-hole cover; an inwardly extending lug on the inner side of the hand-hole cover; catch means on the said lug and comprising a flat-provided projection, coaxial with the said fulcrum axis; and a bracket, provided with a narrow necked slot, on the said cover panel and adapted to co-operate with said projection, the shape and dimensions of said flat-provided projection and said slot being such that the projection cannot be disengaged whilst the hand-hole cover remains flush with the cover panel but so related that the flat side of the said projection must be registered with one side of the outlet neck of said slot before said projection can be disengaged from said bracket to permit bodily inward movement of the hand-hole cover.

References Cited in the file of this patent

UNITED STATES PATENTS

| | | |
|---|---|---|
| 1,866,299 | Ericson | July 5, 1932 |
| 2,416,889 | Andrews | Mar. 4, 1947 |
| 2,424,962 | Best | Aug. 5, 1947 |
| 2,440,817 | Benson | May 4, 1948 |
| 2,479,921 | Gander | Aug. 23, 1949 |
| 2,699,962 | Hogan | Jan. 18, 1955 |

FOREIGN PATENTS

| | | |
|---|---|---|
| 672,423 | Germany | Mar. 2, 1939 |